United States Patent
Patil et al.

(10) Patent No.: US 8,825,980 B2
(45) Date of Patent: Sep. 2, 2014

(54) CONSIDERATION OF ADJACENT TRACK INTERFERENCE AND WIDE AREA ADJACENT TRACK ERASURE DURING DISK DEFRAGMENTATION

(75) Inventors: Sandeep R. Patil, Pune (IN); Sriram Ramanathan, Lutz, FL (US); Riyazahamad M. Shiraguppi, Pune (IN); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/426,138

(22) Filed: Mar. 21, 2012

(65) Prior Publication Data
US 2013/0254509 A1    Sep. 26, 2013

(51) Int. Cl.
G06F 12/00    (2006.01)
(52) U.S. Cl.
USPC ........... 711/170; 711/165; 711/171; 711/172; 711/173
(58) Field of Classification Search
USPC .......................................... 711/165, 170–173
See application file for complete search history.

(56) References Cited

U.S. PATENT DOCUMENTS

| 7,447,836 | B2 | 11/2008 | Zhang et al. |
| 7,522,366 | B2 | 4/2009 | Mettler et al. |
| 7,567,397 | B2 | 7/2009 | Lu |
| 7,747,907 | B2 | 6/2010 | Olds et al. |
| 7,996,636 | B1 | 8/2011 | Prakash et al. |
| 8,014,097 | B1 | 9/2011 | Sanvido |
| 2007/0208904 | A1 | 9/2007 | Hsieh et al. |
| 2008/0077762 | A1 | 3/2008 | Scott et al. |
| 2008/0287802 | A1 | 11/2008 | Li et al. |
| 2009/0049238 | A1 | 2/2009 | Zhang et al. |
| 2009/0135693 | A1 | 5/2009 | Kim et al. |
| 2009/0244775 | A1* | 10/2009 | Ehrlich ......................... 360/135 |
| 2010/0180093 | A1 | 7/2010 | Huber et al. |
| 2010/0268866 | A1 | 10/2010 | Colligan |

(Continued)

FOREIGN PATENT DOCUMENTS

WO    9746953 A1    11/1997

OTHER PUBLICATIONS

Patil et al. "Consideration of Adjacent Track Interference and Wide Area Adjacent Track Erasure During Block Allocation", U.S. Appl. No. 13/425,899, filed Mar. 21, 2012.

(Continued)

*Primary Examiner* — Jasmine Song
(74) *Attorney, Agent, or Firm* — Nicholas L. Cadmus; Noah Sharkan

(57) ABSTRACT

Embodiments of the present invention provide a system, method, and program product for defragmenting files on a hard disk drive. A computer system identifies a plurality of movable blocks on a hard disk drive. The computer system categorizes each of the movable blocks into a category based on the write count of each movable block, wherein the movable blocks categorized into a first category have higher write counts than the movable blocks categorized into a second category. The computer system relocates the movable blocks of the first category to a first group of one or more adjacent tracks, and the computer system relocates the movable blocks of the second category to a second group of one or more adjacent tracks, wherein the first group of one or more adjacent tracks and the second group of one or more adjacent tracks share, at most, one common track.

18 Claims, 7 Drawing Sheets

(56) References Cited

U.S. PATENT DOCUMENTS

| | | |
|---|---|---|
| 2011/0026159 A1 | 2/2011 | Tsai et al. |
| 2011/0075290 A1 | 3/2011 | Hobbet |
| 2011/0181978 A1 | 7/2011 | Rub |

OTHER PUBLICATIONS

"Disk Defragmenter (Windows)—Wikipedia, the free encyclopedia". [online] [retrieved on: Jan. 13, 2012]. Retrieved from the internet: <URL:http:en.wikipedia.org/w/index.php?title=disk_Defragmenter_(Windows)&oldid=435960617>.

Guha, A. "Disk Failure Rates and Implications of Enhanced MAID Storage Systems". Copan Systems. Apr. 27, 2006. Longmont, CO.

Scholz, Sebastian. "The Write Anywhere File Layout System (WAFL)", based on "File System Design for an NFS File Server Appliance" by Dave Hitz, James Lau and Michael Malcolm, Network Appliance, Inc. [online] [retrieved in Jun. 2011]. Retrieved from the internet: <URL:http://comet.lehman.cuny.edu/jung/cmp426697/WAFL.pdf>.

Tang, Yuhui, et al. "Understanding Adjacent Track Erasure in Discrete Track Media". To Appear in the IEEE Transaction on Magnetics, Sep. 2008. Department of Electrical and Computer Engineering, Carnegie Mellon University, Pittsburgh, PA. USA. Samsung Information Systems America, San Jose, CA. USA.

Tang, Yuhui, et al. "Understanding Adjacent Track Erasure in Discrete Track Media". IEEE Transactions on Magnetics, vol. 44. No. 12. Dec. 2008. Digital Objet Identifier 10.1109/TMAG.2008.2003342.

* cited by examiner

CONSIDERATION OF ADJACENT TRACK INTERFERENCE AND WIDE AREA ADJACENT TRACK ERASURE DURING DISK DEFRAGMENTATION

TECHNICAL FIELD

The present invention relates generally to hard disk drives and, more particularly, to performing disk defragmentation operations on hard disk drives.

BACKGROUND

At present, hard disk drives are one of the most common forms of electronic data storage devices. Hard disk drives typically contain multiple magnetic disks ("platters") which serve as the storage media. The platters are rotated and magnetic heads write data as a series of magnetic polarity transitions in a plurality of concentric circular tracks on the surfaces of the platters. For example, a track region of uniform magnetic polarity can represent a "0" and a track region containing a transition from one magnetic polarity to the opposite magnetic polarity can represent a "1", where each "0" or "1" constitutes a bit. The magnetic heads can also read stored data by moving into position over particular tracks and detecting these magnetic polarity transitions (or the absence thereof) as the platters rotate beneath.

Each platter is divided into geometrical sectors. The intersections of geometrical sectors and the concentric circular tracks define data sectors. Each data sector typically consists of 512 bytes, and each byte typically consists of 8 bits. A block, which typically represents the smallest storage unit that can be allocated for storing data, consists of a contiguous group of data sectors. For example, a 4 kilobyte block typically consists of 8 contiguous data sectors (i.e., 512 byte sectors).

An ever-present concern in hard disk drive technology is adjacent track interference (ATI) and wide area adjacent track erasure (ATE). ATI occurs when a head successively writes data on a particular track of a platter and the magnetic field of the head weakens the magnetic polarity transitions on adjacent tracks, potentially to the extent that the data on the adjacent tracks becomes unreadable. ATE is a similar effect that has the potential to corrupt data on a larger number of adjacent tracks. For example, if data stored on track N is frequently modified (e.g., the head is frequently performing writes to that track region), data located on adjacent tracks N+1 and N−1 that is near the high-write region of track N can be subject to ATI and ATE. As the disparity in write frequencies of data on adjacent tracks becomes greater, the potential for ATI and ATE typically increases. For example, infrequently written data that is adjacent to a track region with a high write frequency is especially susceptible to ATI and ATE.

A file system enables applications to store and access data on a hard disk drive. To store a file on a hard disk drive using a typical file system, the file system must initially allocate a whole number of free blocks for the file to use. Based on the anticipated size of a file to be stored, an application can issue allocation requests to the file system for the appropriate number of free blocks. Later, if the size of the file increases, the file system can allocate additional free blocks; if the file size is reduced or the file is deleted, the file system can free the file's allocated blocks for future allocation.

Generally, the file system will allocate a contiguous group of free blocks for a file because this method can ultimately enable faster access to the file. For example, if all blocks allocated for a file are contiguous on a single track, the entire file can be accessed on a single platter rotation (i.e., reduced rotational latency) and without having to move the heads to multiple tracks (i.e., reduced seek time).

However, if a contiguous group of free blocks is not available during initial allocation or a subsequent increase in file size, a single file may be allocated free blocks that are non-contiguously distributed over the tracks of a platter or multiple platters within the stack of a hard disk drive. The resulting non-contiguous distribution of blocks of a file ("fragments") is referred to as fragmentation, and each fragment of a file can consist of one block or multiple contiguous blocks. Fragmentation, in contrast to a contiguous distribution of blocks of a file, can negatively affect system and hard disk drive performance on account of increased rotational latency and seek times. To ameliorate these negative effects, disk defragmentation software can be used to consolidate fragments of files on a hard disk drive by relocating the fragmented blocks of files such that they are contiguous on the hard disk drive.

A common defragmentation method employed by defragmentation software involves consolidating movable fragments of files such that the blocks of each file are contiguous and located on outer tracks. Consolidating movable fragments on outer tracks can help improve file access times because of the higher media transfer rates of outer tracks (i.e., with zone bit recording and constant rotational velocity of platters, the greater linear velocity and quantity of blocks on outer tracks enables more of those blocks to be accessed by a head per unit of time relative to blocks on inner tracks). Some defragmentation software further considers the size of each fragment and may not consolidate otherwise movable fragments of a file if those fragments consist of a sufficiently large number of contiguous blocks. For example, if a fragment consists of a sufficiently large number of contiguous blocks (e.g., 64 MB of combined storage space) such that any potential performance gains (e.g., reduced seek times) are negligible compared to the time it takes to read the large fragment, defragmentation software may not consolidate that fragment because it may be a waste of system resources.

As a consequence of giving preference to outer tracks during defragmentation, blocks within these regions will often experience a high number of writes, while blocks on inner tracks adjacent to these high-write regions will often experience a lesser number of writes. Similarly, blocks located on the outer tracks that contain immovable data may experience substantially fewer writes than the neighboring blocks to which data is frequently written during defragmentation. Accordingly, this defragmentation method can result in a distribution of blocks that is ripe for ATI and ATE effects.

One technique to minimize the potential for ATI and ATE involves reducing the number of tracks per inch (TPI) on the platters. By decreasing the TPI, tracks are spaced farther apart, which can help reduce the extent to which the heads' magnetic fields affect the data stored on adjacent tracks. However, decreasing the TPI typically reduces the storage capacity of a platter. Further, decreasing TPI can result in poorer performance due to increased seek times.

Other techniques to minimize the potential for ATI and ATE involve periodically performing refresh cycles. In a typical refresh cycle, the data on a track that is potentially subject to ATI and ATE is read and then rewritten in the same location. Rewriting the data helps ensure its continued integrity by strengthening the magnetic polarity transitions that may have been weakened by ATI and ATE. The tracks on which to perform refresh cycles can be determined by monitoring the number of write operations on each track and, upon reaching a threshold number of write operations for a given track, performing a refresh cycle on the tracks adjacent to that track. However, performing refresh cycles can negatively impact performance on account of increased seek times and because certain read and write functions cannot be performed during refresh cycles. Further, performing refresh cycles can involve additional head movement, additional platter rotations, and other hard disk drive processes that may increase power consumption.

SUMMARY

Embodiments of the present invention provide a system, method, and program product for defragmenting files on a hard disk drive. A computer system identifies a plurality of movable blocks on a hard disk drive, wherein a movable block is a block of storage space on the hard disk drive that is allocated for a file and that can be relocated to a different location on the hard disk drive. The computer system maintains a write count for each movable block, wherein a write count is a cumulative number of write operations performed on a movable block. The computer system categorizes each of the movable blocks into one of a plurality of categories based on the write count of each movable block, wherein the movable blocks categorized into a first category of the plurality of categories have higher write counts than the movable blocks categorized into a second category of the plurality of categories. The computer system relocates the movable blocks of the first category to a first group of one or more adjacent tracks of the hard disk drive such that at least one of the movable blocks of the first category which is allocated for a first file is contiguous on the hard disk drive with another movable block of the first category which is also allocated for the first file. The computer system relocates the movable blocks of the second category to a second group of one or more adjacent tracks of the hard disk drive such that at least one of the movable blocks of the second category which is allocated for a second file is contiguous on the hard disk drive with another movable block of the second category which is also allocated for the second file, wherein the first group of one or more adjacent tracks and the second group of one or more adjacent tracks share, at most, one common track.

DETAILED DESCRIPTION

Embodiments of the present invention will now be described in detail with reference to the accompanying drawings.

Figure 1:
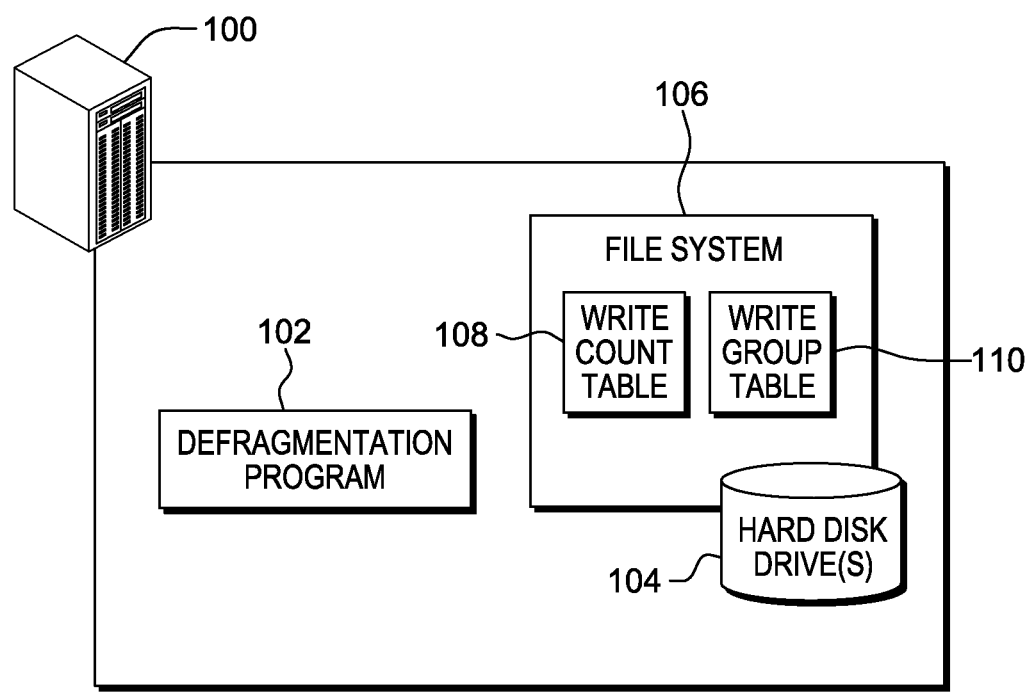
FIG. 1 is a block diagram of a computer system in accordance with an embodiment of the present invention.

FIG. 1 is a functional block diagram of a computer system 100 in accordance with an embodiment of the present invention. Computer system 100 can be a desktop computer, laptop computer, specialized computer server, or any other computer system known in the art. In certain embodiments, computer system 100 represents a computer system utilizing clustered computers and components to act as a single pool of seamless resources when accessed through a network. For example, such embodiments may be used in datacenter, cloud computing, storage area network (SAN), and network attached storage (NAS) applications. In general, computer system 100 is representative of any electronic device or combination of electronic devices capable of executing machine-readable program instructions, as described in greater detail with regard to FIG. 6.

Computer system 100 includes defragmentation program 102, one or more hard disk drives 104, file system 106, write count table 108, and write group table 110. Defragmentation program 102 is a program that performs disk defragmentation operations on one or more hard disk drives 104 in accordance with embodiments of the present invention, as discussed in greater detail with regard to FIGS. 3 through 5. Defragmentation program 102 can be implemented as a modified version of an existing defragmentation software program or suite of software programs.

Hard disk drives 104 may be, for example, one or more Advanced Technology Attachment (ATA), Serial ATA (SATA), Small Computer System Interface (SCSI), or Serial Attached SCSI (SAS) compatible hard disk drives. In a preferred embodiment, hard disk drives 104 use zone bit recording and have an integrated RAM and/or cache memory. In general, hard disk drives 104 may be any computer-readable tangible storage devices that utilize rotatable magnetic storage media. Hard disk drives 104 may be implemented with a plurality of hard disk drives in different configurations, such as, for example, as independent hard disk drives or as a plurality of hard disk drives in a redundant array of independent disks (RAID). Hard disk drives 104 can utilize a logical volume manager and contain one or more logical volumes in different configurations. For example, multiple hard disk drives 104 can each contain a single logical volume or multiple logical volumes, or a single logical volume can span multiple hard disk drives 104 (e.g., SAN applications). Hereinafter, for purposes of explanation, embodiments of the present invention will be discussed with regard to a single hard disk drive 104.

File system 106 enables applications, including defragmentation program 102, to store, access, and delete data on hard disk drive 104 in accordance with embodiments of the present invention. Generally, the functionalities of file system 106 can be divided into high and low levels. At the high level, file system 106 enables applications to access logical records of data stored on hard disk drive 104. For example, file system 106 can maintain and provide to applications a logical presentation of data as files and directories. At the low level, file system 106 manages data as blocks on the surfaces of the platters of hard disk drive 104. For example, file system 106 can manage all free and allocated blocks on hard disk drive 104. File system 106 can also interface with a hard disk device driver, which can communicate with a controller within hard disk drive 104 to perform read and write functions on the surfaces of the platters. In a preferred embodiment, file system 106 is implemented using an existing file system architecture, such as, for example, a GPFS™ or NTFS file system architecture. It should be appreciated that file system 106 can contain modules (not shown) that handle application requests and file system processes such as, for example, allocation, read, write, and delete requests and their respective file system processes.

File system 106 includes write count table 108 and write group table 110. Tables 108 and 110 are created during file system creation and are maintained by file system 106. Tables 108 and 110 are utilized by defragmentation program 102 during disk defragmentation operations in accordance with embodiments of the present invention. Write count table 108 contains information pertaining to each block on hard disk drive 104, including the cumulative number of write operations performed on each block ("write count"), as discussed in greater detail with regard to FIG. 2A. Write group table 110 defines multiple groups of allocated blocks based on threshold numbers of write counts, as discussed in greater detail with regard to FIG. 2B. It should be appreciated that, depending on design choice and the architecture of file system 106, file system 106 can include additional tables or fewer tables. For example, NTFS file system architectures typically utilize a master file table (MFT). In certain embodiments of the present invention, the information contained in tables 108 and 110 can be incorporated into such other tables.

Figure 2A:
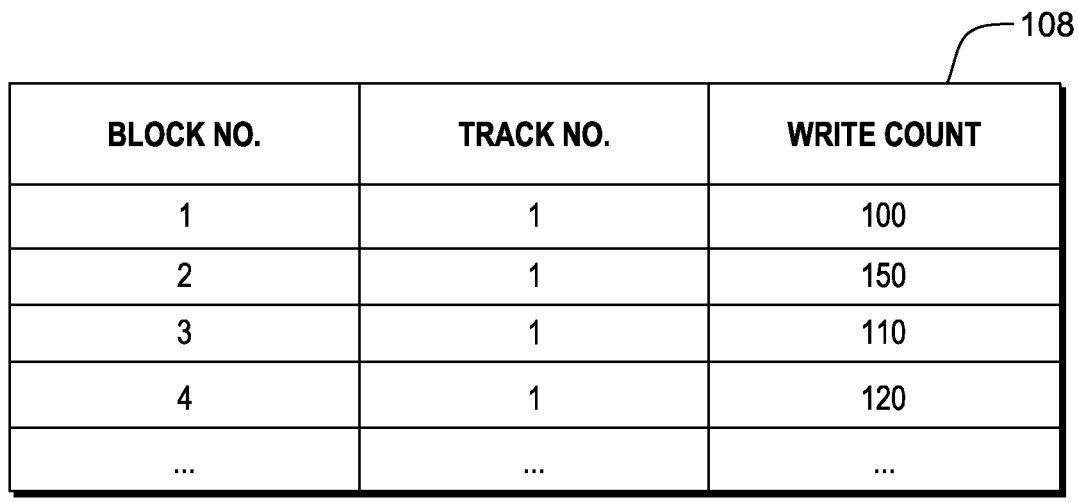
FIGS. 2A and 2B show illustrations of the tables of FIG. 1 in accordance with an embodiment of the present invention.
Figure 2B:
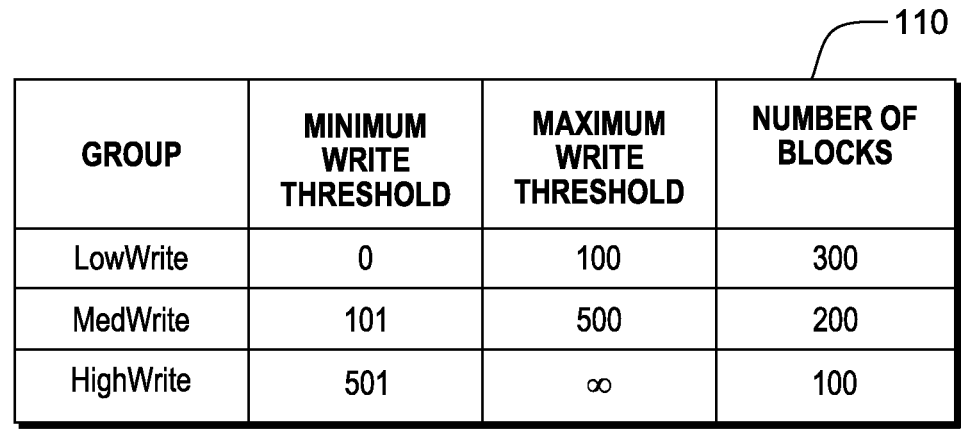

Turning now to FIGS. 2A and 2B, tables 108 and 110 are shown in accordance with embodiments of the present invention. For illustrative purposes, these exemplary tables include fictitious values that reflect fictitious file system activity that has occurred after file system creation. The values found in these tables are not necessarily intended to be representative of actual values that might be generated when practicing embodiments of the present invention.

FIG. 2A depicts a write count table 108 in accordance with an embodiment of the present invention. Write count table 108 contains entries for each block on hard disk drive 104. The "Block No." column identifies each block's logical block number (i.e., logical block address). The "Track" column identifies the track number of the track on which each block is located. The "Write Count" column identifies each block's cumulative write count (i.e., the total number of write operations performed on that block). Defragmentation program 102 can access write count table 108 to identify each allocated block's write count.

FIG. 2B depicts a write group table 110 in accordance with an embodiment of the present invention. Write group table 110 defines multiple write groups (i.e., categories) based on threshold numbers of write counts. During file system creation, an administrative user of computer system 100 can specify the number of write groups to use based on his or her desired level of granularity. In a preferred embodiment, write group table 110 contains at least three write groups (as shown in FIG. 2B, for example).

The "Group" column contains the name of each write group (e.g., LowWrite, MedWrite, and HighWrite). The "Minimum Write Threshold" and "Maximum Write Threshold" columns contain user-specified minimum and maximum write count thresholds, respectively. Defragmentation program 102 utilizes these minimum and maximum thresholds to group together (i.e., categorize) allocated blocks into the appropriate write groups based on the write counts of the allocated blocks. The "Number of Blocks" column indicates the total number of blocks within each write group.

If, as a result of file system processes, the write count thresholds of a write group are less than the write counts of all allocated blocks, the write count thresholds of the write group can be updated. For example, if, over time, the write counts of all allocated blocks exceed the write count thresholds of the write group with the lowest write count thresholds, the write count thresholds for that write group can be increased, and the write count thresholds of the remaining write groups can be adjusted upward accordingly.

Figure 3:
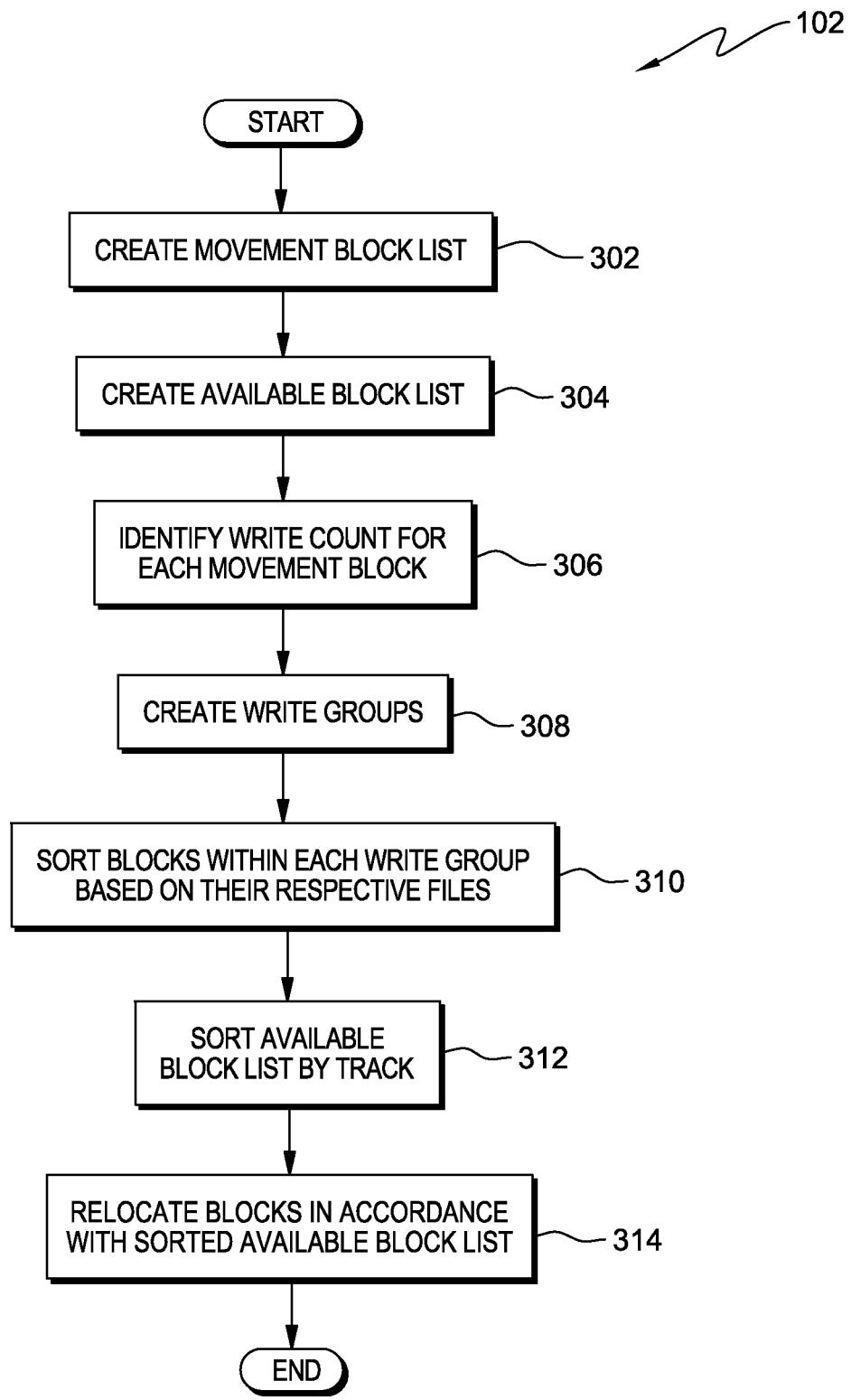
FIG. 3 is a flowchart illustrating operational steps for performing a disk defragmentation operation in accordance with an embodiment of the present invention.

FIG. 3 is a flowchart illustrating operational steps defragmentation program 102 performs during a disk defragmentation operation in accordance with an embodiment of the present invention. In step 302, defragmentation program 102 identifies all allocated blocks on hard disk drive 104 that can be relocated ("movement blocks") and creates a list of those blocks ("movement block list"). For example, defragmentation program 102 can query file system 106, which maintains a record of each block's allocation status and whether each block's data can be relocated.

In step 304, defragmentation program 102 identifies all free blocks on hard disk drive 104 and creates a list of those blocks, to which it adds the blocks listed on the movement block list. For example, defragmentation program 102 can query file system 106 to identify the free blocks (i.e., unallocated blocks). The resulting list ("available block list") represents all of the blocks on hard disk drive 104 to which movement blocks can be relocated during defragmentation.

In step 306, defragmentation program 102 accesses write count table 108 to identify the write count of each movement block. In step 308, defragmentation program 102 accesses write group table 110 and creates groups of movement blocks in accordance with the minimum and maximum write count thresholds for each write group. For example, with regard to the exemplary write group table 110 depicted in FIG. 2B, defragmentation program 102 would group together all movement blocks whose write counts are less than or equal to 100 into the LowWrite group.

In step 310, defragmentation program 102 sorts the movement blocks within each of the groups created in step 308 based on their respective files. That is, defragmentation program 102 sorts the movement blocks based on the files for which they are allocated, resulting in one or more file fragments that can each be comprised of one or more allocated blocks of a file.

In step 312, defragmentation program 102 sorts the available block list based on each block's track number. The available blocks are sorted sequentially beginning with blocks having the lowest track number (i.e., residing on outer tracks) and ending with blocks having the highest track number (i.e., residing on inner tracks). In other embodiments of the present invention, the available blocks can be sorted in a different fashion such as, for example, beginning with blocks having the highest track number and ending with blocks having the lowest track number. Defragmentation program 102 identifies the track number of each of the blocks on the available block list by accessing write count table 108.

In step 314, defragmentation program 102 relocates the grouped movement blocks in accordance with the sorted available block list. Relocating a movement block involves copying the movement block's data to an available block, and freeing the movement block (i.e., the storage space previously used by the file) for future allocation. Movement blocks in the write group with the highest write count thresholds are relocated to available blocks appearing first on the sorted available block list (i.e., outer tracks), followed by movement blocks in the write group with the second highest write count thresholds, and so on. For example, with regard to the exemplary write group table 110 depicted in FIG. 2B, defragmentation program 102 would relocate the movement blocks in the HighWrite group to the available blocks that exist on the outermost tracks, followed by the movement blocks in the MedWrite group, and followed lastly by the movement blocks in the LowWrite group. The resulting distribution of movement blocks can have the net effect of relocating files' allocated blocks such that they are primarily contiguous on hard disk drive 104 and are located adjacent to allocated blocks having similar write counts, which can decrease the potential for ATI and ATE effects.

Figure 4:
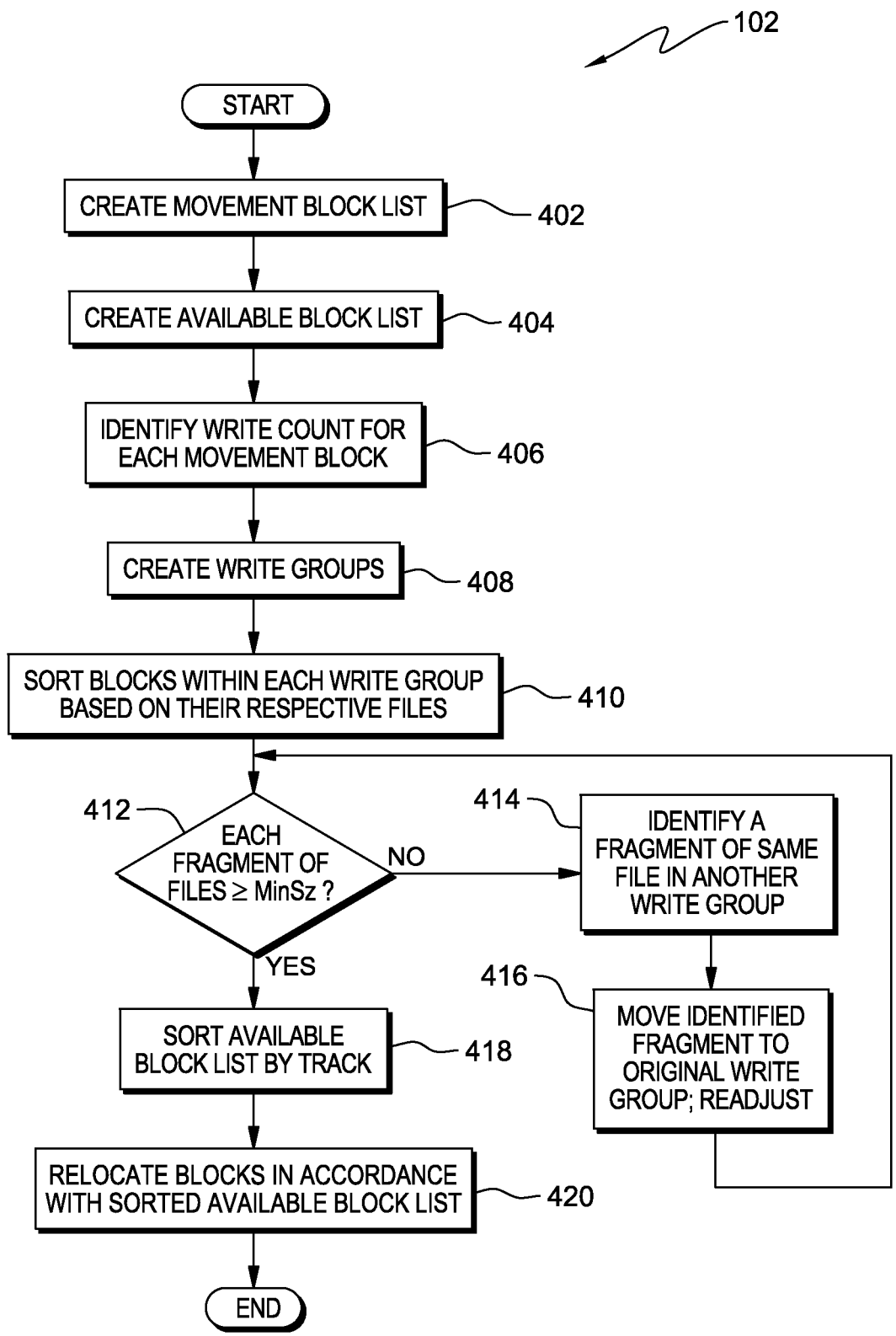
FIG. 4 is a flowchart illustrating operations steps for performing a disk defragmentation operation in accordance with another embodiment of the present invention.

FIG. 4 is a flowchart illustrating operations steps defragmentation program 102 performs during a disk defragmentation operation in accordance with another embodiment of the present invention. The embodiment depicted in FIG. 4 accounts for the possibility that, during defragmentation in accordance with the operational steps of FIG. 3, fragments of a particular file may exist in separate write groups (e.g., allocated blocks that comprise one fragment of a file may have higher write counts than those that comprise another fragment of the file) and therefore be relocated to different tracks on hard disk drive 104. In the embodiment depicted in FIG. 4, defragmentation program 102 can adjust the sizes of file fragments to help ensure that file fragments that remain on different tracks after defragmentation are of sufficient size such that any potential negative performance effects associated with the file fragments existing on different tracks are negligible compared to the time required to read the file fragments.

Operational steps 402 through 410 are equivalent to operation steps 302 through 310 of FIG. 3, respectively. Operational steps 418 and 420 are equivalent to operational steps 312 and 314, respectively. Accordingly, for an explanation of these steps please refer to the discussion of FIG. 3.

In step 412, defragmentation program 102 determines whether each file fragment within a particular write group ("original write group") has a combined storage capacity that is greater than or equal to a specified minimum size. For example, a file fragment within a particular write group can be comprised of multiple blocks allocated for the same file. In step 412, defragmentation program 102 would determine whether those multiple allocated blocks have a combined storage capacity that is greater than or equal to the specified minimum size. An administrative user of computing system 100 can specify the minimum size based on a calculation of how large a file fragment must be to render any negative performance effects associated with the file fragment not being contiguous with the remainder of the file (e.g., increased seek latency) negligible compared to the time required to read the file fragment (i.e., read latency). In a preferred embodiment, the specified minimum size is 64 MB.

If, in step 412, defragmentation program 102 determines that a file fragment within the original write group does not have a combined storage capacity that is greater than or equal to the specified minimum size, then, in step 414, defragmentation program identifies a fragment or portion of a fragment of the same file in another write group that can be moved into the original write group such that the file fragment in the original write group and any remaining fragments or portions of a fragment of the same file in the other write group will each have a combined storage capacity that is greater than or equal to the specified minimum size.

In step 416, defragmentation program 102 moves (i.e., re-categorizes) the identified file fragment or portion of a file fragment into the original write group and readjusts the write group such that the allocated blocks are appropriately sorted based on their respective files. After step 416, defragmentation program 102 repeats operational steps 412 through 416 for each file fragment within each write group.

The operational steps discussed with regard to FIGS. 3 and 4 are illustrative of two or more embodiments of the present invention. It should be understood that the content of each step, as well as the order of operation, can be modified without departing from the spirit and intended scope of the present invention.

Figure 5A:
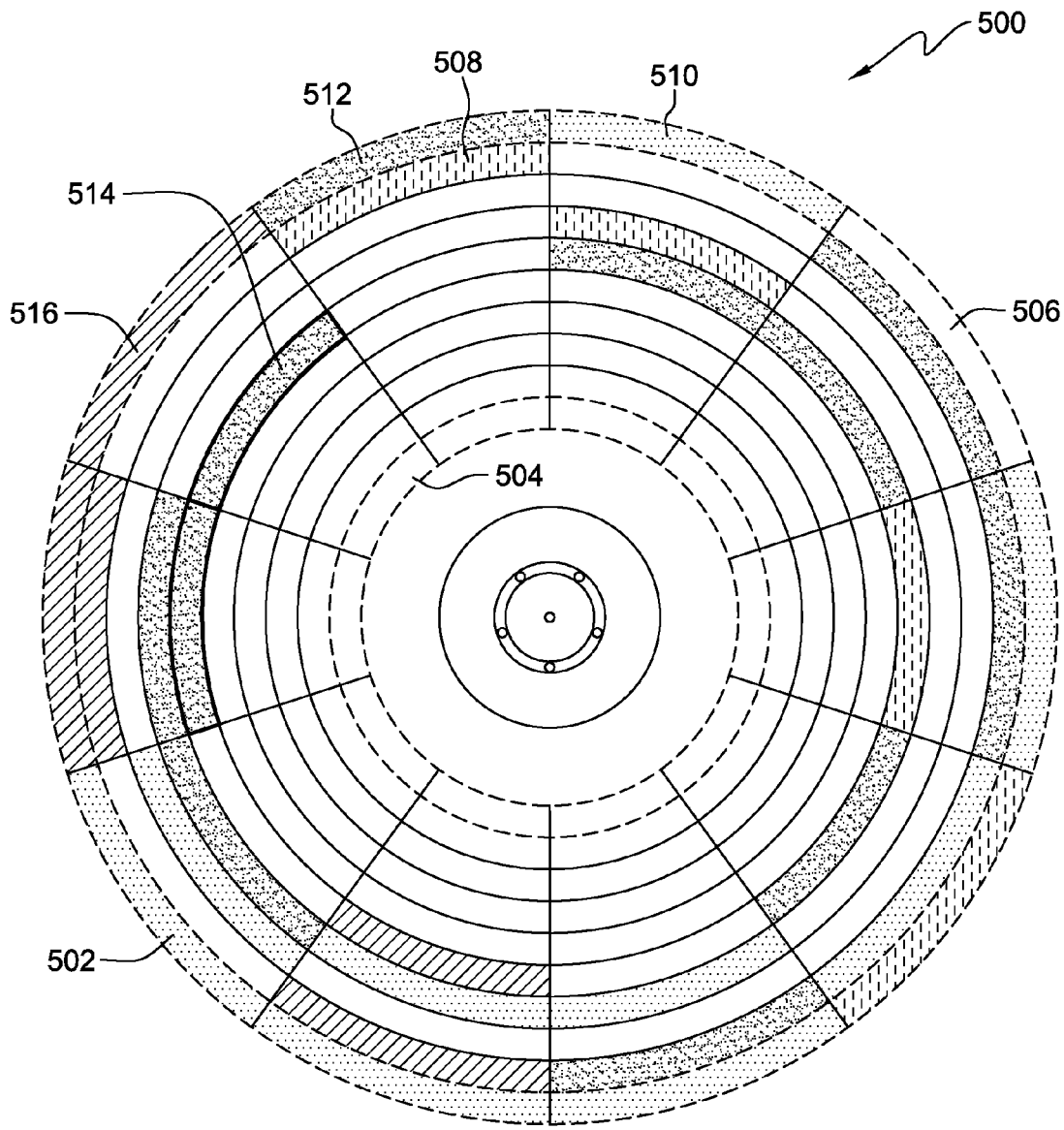
FIGS. 5A and 5B are diagrams of a platter illustrating a hypothetical scenario in which a disk defragmentation operation is performed in accordance with an embodiment of the present invention.
Figure 5B:
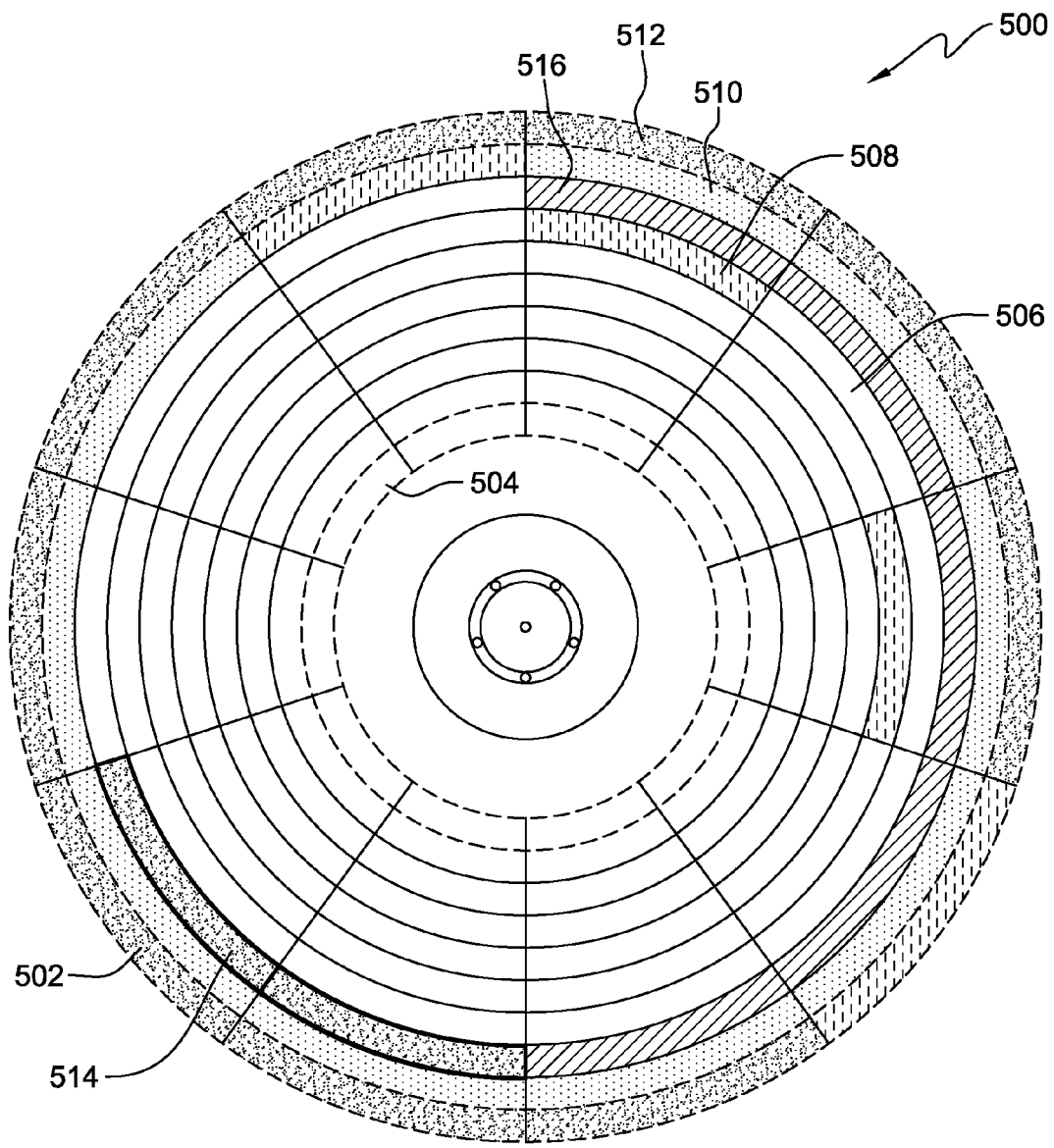

FIGS. 5A and 5B are diagrams of a platter illustrating a hypothetical scenario in which a disk defragmentation operation is performed in accordance with an embodiment of the present invention. FIG. 5A depicts a platter 500 before defragmentation (i.e., before relocation) and FIG. 5B depicts the same platter 500 after defragmentation (i.e., after relocation) in accordance with an embodiment of the present invention. Platter 500 can be, for example, one of several platters within hard disk drive 104. FIGS. 5A and 5B reference the exemplary write groups depicted in FIG. 2B.

Referring now to FIG. 5A, platter 500 includes ten tracks, where track 502 represents track 1 (i.e., the outermost track) and track 504 represents track 10 (i.e., the innermost track). It should be appreciated that platter 500 is a simplified illustration. For example, platter 500, as depicted, possesses a small number of tracks and blocks; each depicted block consists of a finite number of data sectors, and each platter in hard disk drive 104 can contain many more tracks and blocks than depicted.

Blocks 506 represent free blocks (i.e., unallocated blocks). Blocks 508 represent immovable allocated blocks (i.e., allocated blocks that can not be relocated during defragmentation). Blocks 510 represent blocks of a hypothetical file A that exist in the MedWrite group (i.e., the write counts are within the write count thresholds of the MedWrite group). Blocks 512 represent blocks of a hypothetical file B that exist in the HighWrite group (i.e., the write counts are within the write count thresholds of the HighWrite group). Blocks 514 represent blocks of the same hypothetical file B, but that exist in the LowWrite group (i.e., the write counts are within the write count thresholds of the LowWrite group), as indicated by the bold borders. Blocks 516 represent blocks of a hypothetical file C that exist in the LowWrite group (i.e., the write counts are within the write count thresholds of the LowWrite group).

In this hypothetical scenario, many allocated blocks of various files (i.e., fragments of files) are non-contiguously distributed throughout the tracks of platter 500. Such a distribution can negatively affect performance on account of increased seek time, rotational latency, and overall power consumption. All blocks except blocks 508 exist on the available block list. The movement block list includes blocks 510 through 516.

Referring now to FIG. 5B, platter 500 is shown after a hypothetical disk defragmentation operation has been completed in accordance with an embodiment of the present invention. Immovable blocks 508 were not affected during the defragmentation operation. Blocks 512, having been in the HighWrite group, have been relocated such that they are contiguous and located on track 1 (i.e., the outermost available blocks). Blocks 510, having been in the MedWrite group, have been relocated such that they are contiguous and located on track 2 (i.e., the outermost available blocks after relocating blocks 512). Blocks 516, having been in the LowWrite group, have been relocated such that they are contiguous and located on track 3 (i.e., the outermost available blocks after relocating blocks 510 and 512). Lastly, blocks 514, while also blocks of file B, were not relocated to be contiguous with blocks 512 because they existed in the LowWrite group. Instead, blocks 512 have also been relocated to track 3 (i.e., the outermost available blocks after relocating blocks 510, 512, and 516).

Accordingly, the exemplary defragmentation operation depicted by FIGS. 5A and 5B can yield several potential performance gains. For example, blocks of each file have been made contiguous on platter 500, which can reduce seek times and rotational latency; blocks of each file having higher write counts have been relocated to the outermost tracks, which can result in faster performance on account of frequently written files being placed on tracks with higher media transfer rates; and blocks of each file have been relocated such that the disparity in write counts of blocks on adjacent tracks is reduced, which can reduce the potential for ATI and ATE.

Figure 6:
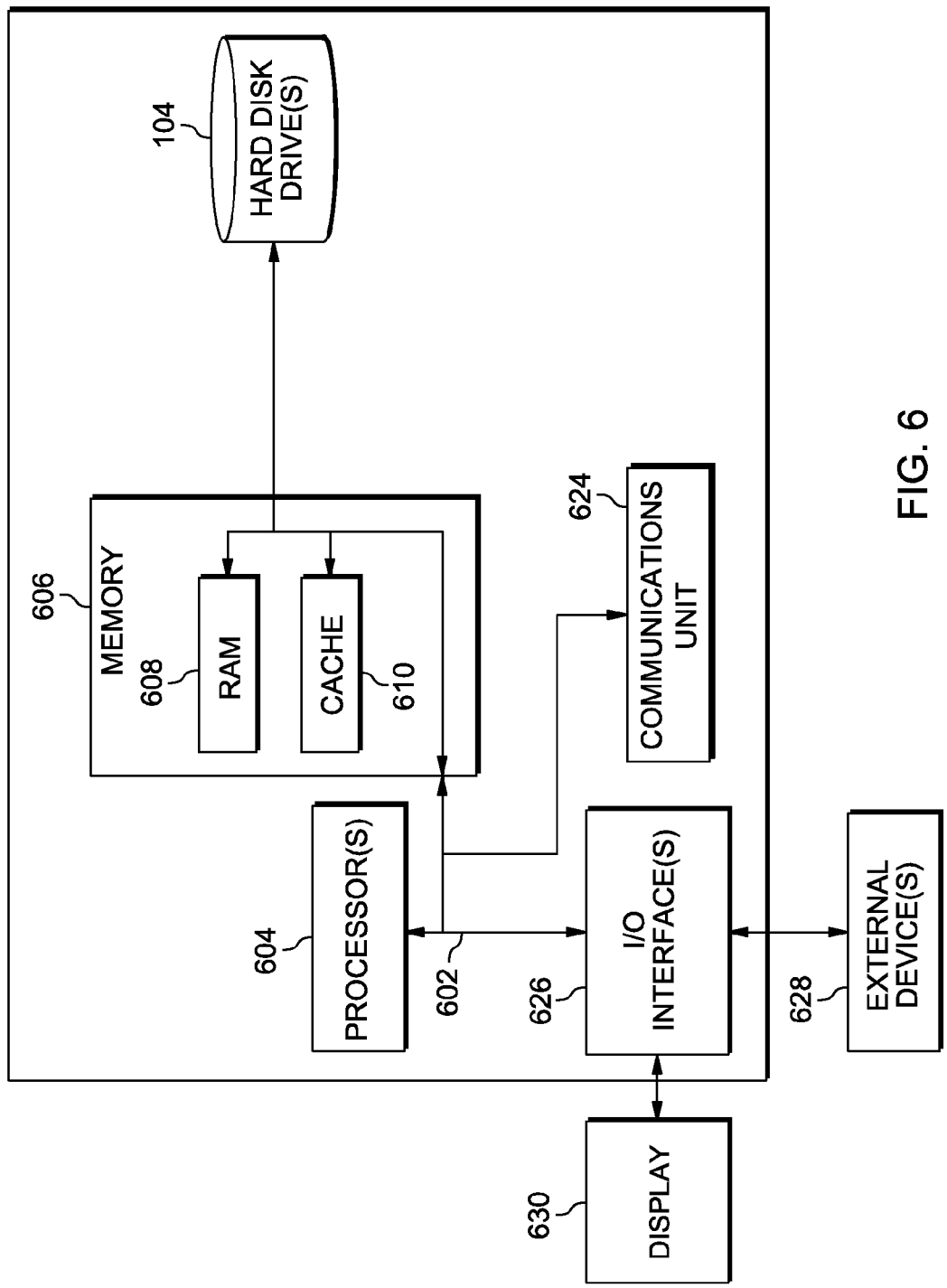
FIG. 6 is a block diagram of internal and external components of the computer system of FIG. 1 in accordance with an embodiment of the present invention.

FIG. 6 is a block diagram of internal and external components of computer system 100 in accordance with an embodiment of the present invention. Examples of computer systems, environments, and/or configurations that may be represented by computer system 100 include, but are not limited to, desktop computers, laptop computers, server computers, thin clients, thick clients, multiprocessor systems, microprocessor-based systems, and distributed cloud computing environments that include any of the above systems or devices.

Computer system 100 includes one or more buses 602, which provide for communications between one or more processors 604, memory 606, one or more hard disk drives 104, communications unit 624, and one or more input/output (IO) interfaces 626.

Memory 606 and hard disk drives 104 are examples of computer-readable tangible storage devices. Computer-readable tangible storage devices are hardware capable of storing information such as data, program code in functional form, and/or other suitable information on a temporary basis and/or permanent basis. A computer-readable tangible storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Memory 606 can include one or more random access memories (RAM) 608, cache memory 610, or any other suitable volatile or non-volatile storage device. For a more detailed explanation of hard disk drives 104, please refer to the discussion of FIG. 1.

Software and data, including one or more operating systems, defragmentation program 102, file system 106, write count table 108, and write group table 110 can be stored on hard disk drives 104 for access and/or execution by one or more of the respective processors 604 via one or more memories of memory 606.

Communications unit 624 provides for communications with other computer systems and/or devices via a network such as, for example, a local network, the Internet, or another wide area network. The network may comprise, for example, copper wires, optical fibers, wireless transmission, routers, firewalls, switches, gateway computers, and/or edge servers. Communications unit 624 may include network adapters or interfaces such as TCP/IP adapter cards, wireless Wi-Fi interface cards, 3G or 4G wireless interface cards, or interfaces for other wired or wireless communications links. Software and data used to practice embodiments of the present invention can be downloaded to computer system 100 from an external computer system via a network and communications unit 624 and can be loaded onto hard disk drives 104.

One or more I/O interfaces 626 allow for input and output of data with other devices that may be connected to computer system 100. For example, I/O interfaces 626 can provide a connection to one or more external devices 628 and display 630. External devices 628 can include a keyboard, computer mouse, touch screen, and other human interface devices. External devices 628 can also include portable computer-readable tangible storage devices such as, for example, thumb drives, portable optical or magnetic disks, and/or memory cards. Software and data used to practice embodiments of the present invention can be stored on such portable storage devices and can be loaded onto hard disk drives 104.

Display 630 provides a mechanism to display data to a user of computer system 100 and can be, for example, a computer monitor. Alternatively, display 630 can be an incorporated display that also functions as an input device, such as, for example, a display of a tablet computer that also functions as a touch screen.

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a computer system such as a general purpose computer, special purpose computer, or other programmable data processing apparatus to produce a machine, such that instructions, which execute via the processor of the computer system or other programmable data processing apparatus, create means for implementing the functions/acts specified in the flowchart and/or block diagram blocks.

The aforementioned programs can be written in any combination of one or more programming languages, including, for example, low-level, high-level, object-oriented or non object-oriented languages, such as Java, Smalltalk, C, and C++. The program code may execute entirely on a user's computer system, partly on a user's computer system, as a stand-alone software package, partly on a user's computer system and partly on a remote computer system, or entirely on a remote computer system or server. In the latter scenario, the remote computer system may be connected to the user's computer system through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware.

The foregoing description of various embodiments of the present invention has been presented for purposes of illustration and description. It is not intended to be exhaustive nor limit the invention to the precise form disclosed. Many modifications and variations of the present invention are possible. Such modifications and variations that may be apparent to a person skilled in the art of the invention are intended to be included within the scope of the invention as defined by the accompanying claims.

What is claimed is:

1. A method for defragmenting files on a hard disk drive, the method comprising the steps of:
    a computer system identifying a plurality of movable blocks on a hard disk drive, wherein a movable block is a block of storage space on the hard disk drive that is allocated for a file and that can be relocated to a different location on the hard disk drive;
    the computer system maintaining a write count for each movable block, wherein a write count is a cumulative number of write operations performed on a movable block;
    the computer system categorizing each of the movable blocks into one of a plurality of categories based on the write count of each movable block, wherein the movable blocks categorized into a first category of the plurality of categories have higher write counts than the movable blocks categorized into a second category of the plurality of categories; and the computer system relocating the movable blocks of the first category to a first group of one or more adjacent tracks of the hard disk drive such that at least one of the movable blocks of the first category which is allocated for a first file is contiguous on the hard disk drive with another movable block of the first category which is also allocated for the first file; and the computer system relocating the movable blocks of the second category to a second group of one or more adjacent tracks of the hard disk drive such that at least one of the movable blocks of the second category which is allocated for a second file is contiguous on the hard disk drive with another movable block of the second category which is also allocated for the second file, wherein the first group of one or more adjacent tracks and the second group of one or more adjacent tracks share, at most, one common track.

2. The method of claim 1, wherein the one or more adjacent tracks of the first group of one or more adjacent tracks are, at least in part, outer tracks of the hard disk drive relative to the one or more adjacent tracks of the second group of one or more adjacent tracks.

3. The method of claim 1, wherein the one or more adjacent tracks of the first group of one or more adjacent tracks are, at least in part, inner tracks of the hard disk drive relative to the one or more adjacent tracks of the second group of one or more adjacent tracks.

4. The method of claim 1, further comprising the steps of:
prior to the step of the computer system relocating the movable blocks of the first category to a first group of one or more adjacent tracks of the hard disk drive, the computer system identifying a plurality of movable blocks of the first category that are allocated for a particular file;
the computer system determining whether the plurality of movable blocks of the first category that are allocated for the particular file have a combined storage capacity that is greater than or equal to a specified value;
responsive to the plurality of movable blocks of the first category that are allocated for the particular file not having a combined storage capacity that is greater than or equal to the specified value, the computer system identifying one or more movable blocks that were initially categorized into the second category and that are also allocated for the particular file, and the computer system re-categorizing the one or more movable blocks that were initially categorized into the second category and that are also allocated for the particular file into the first category.

5. The method of claim 4, wherein the one or more adjacent tracks of the first group of one or more adjacent tracks are, at least in part, outer tracks of the hard disk drive relative to the one or more adjacent tracks of the second group of one or more adjacent tracks.

6. The method of claim 4, wherein the one or more adjacent tracks of the first group of one or more adjacent tracks are, at least in part, inner tracks of the hard disk drive relative to the one or more adjacent tracks of the second group of one or more adjacent tracks.

7. A computer system for defragmenting files on a hard disk drive, the system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to identify a plurality of movable blocks on a hard disk drive, wherein a movable block is a block of storage space on the hard disk drive that is allocated for a file and that can be relocated to a different location on the hard disk drive;
program instructions to maintain a write count for each movable block, wherein a write count is a cumulative number of write operations performed on a movable block;
program instructions to categorize each of the movable blocks into one of a plurality of categories based on the write count of each movable block, wherein the movable blocks categorized into a first category of the plurality of categories have higher write counts than the movable blocks categorized into a second category of the plurality of categories; and
program instructions to relocate the movable blocks of the first category to a first group of one or more adjacent tracks of the hard disk drive such that at least one of the movable blocks of the first category which is allocated for a first file is contiguous on the hard disk drive with another movable block of the first category which is also allocated for the first file; and
program instructions to relocate the movable blocks of the second category to a second group of one or more adjacent tracks of the hard disk drive such that at least one of the movable blocks of the second category which is allocated for a second file is contiguous on the hard disk drive with another movable block of the second category which is also allocated for the second file, wherein the first group of one or more adjacent tracks and the second group of one or more adjacent tracks share, at most, one common track.

8. The system of claim 7, wherein the one or more adjacent tracks of the first group of one or more adjacent tracks are, at least in part, outer tracks of the hard disk drive relative to the one or more adjacent tracks of the second group of one or more adjacent tracks.

9. The system of claim 7, wherein the one or more adjacent tracks of the first group of one or more adjacent tracks are, at least in part, inner tracks of the hard disk drive relative to the one or more adjacent tracks of the second group of one or more adjacent tracks.

10. The system of claim 7, wherein the program instructions stored on at least one of the one or more storage devices further comprise program instructions to:
identify a plurality of movable blocks of the first category that are allocated for a particular file;
determine whether the plurality of movable blocks of the first category that are allocated for the particular file have a combined storage capacity that is greater than or equal to a specified value;
responsive to the plurality of movable blocks of the first category that are allocated for the particular file not having a combined storage capacity that is greater than or equal to the specified value, identify one or more movable blocks that were initially categorized into the second category and that are also allocated for the particular file, and re-categorize the one or more movable blocks that were initially categorized into the second category and that are also allocated for the particular file into the first category.

11. The system of claim 10, wherein the one or more adjacent tracks of the first group of one or more adjacent tracks are, at least in part, outer tracks of the hard disk drive relative to the one or more adjacent tracks of the second group of one or more adjacent tracks.

12. The system of claim 10, wherein the one or more adjacent tracks of the first group of one or more adjacent tracks are, at least in part, inner tracks of the hard disk drive relative to the one or more adjacent tracks of the second group of one or more adjacent tracks.

13. A computer program product for defragmenting files on a hard disk drive, the computer program product comprising:

one or more computer-readable tangible storage devices and program instructions, executable by a computer processor, stored on at least one of the one or more computer-readable tangible storage devices, the program instructions comprising:

program instructions to identify a plurality of movable blocks on a hard disk drive, wherein a movable block is a block of storage space on the hard disk drive that is allocated for a file and that can be relocated to a different location on the hard disk drive;

program instructions to maintain a write count for each movable block, wherein a write count is a cumulative number of write operations performed on a movable block;

program instructions to categorize each of the movable blocks into one of a plurality of categories based on the write count of each movable block, wherein the movable blocks categorized into a first category of the plurality of categories have higher write counts than the movable blocks categorized into a second category of the plurality of categories; and program instructions to relocate the movable blocks of the first category to a first group of one or more adjacent tracks of the hard disk drive such that at least one of the movable blocks of the first category which is allocated for a first file is contiguous on the hard disk drive with another movable block of the first category which is also allocated for the first file; and program instructions to relocate the movable blocks of the second category to a second group of one or more adjacent tracks of the hard disk drive such that at least one of the movable blocks of the second category which is allocated for a second file is contiguous on the hard disk drive with another movable block of the second category which is also allocated for the second file, wherein the first group of one or more adjacent tracks and the second group of one or more adjacent tracks share, at most, one common track.

14. The computer program product of claim 13, wherein the one or more adjacent tracks of the first group of one or more adjacent tracks are, at least in part, outer tracks of the hard disk drive relative to the one or more adjacent tracks of the second group of one or more adjacent tracks.

15. The computer program product of claim 13, wherein the one or more adjacent tracks of the first group of one or more adjacent tracks are, at least in part, inner tracks of the hard disk drive relative to the one or more adjacent tracks of the second group of one or more adjacent tracks.

16. The computer program product of claim 13, wherein the program instructions, executable by a computer processor, stored on at least one of the one or more computer-readable tangible storage devices further comprise program instructions to:

identify a plurality of movable blocks of the first category that are allocated for a particular file;

determine whether the plurality of movable blocks of the first category that are allocated for the particular file have a combined storage capacity that is greater than or equal to a specified value;

responsive to the plurality of movable blocks of the first category that are allocated for the particular file not having a combined storage capacity that is greater than or equal to the specified value, identify one or more movable blocks that were initially categorized into the second category and that are also allocated for the particular file, and re-categorize the one or more movable blocks that were initially categorized into the second category and that are also allocated for the particular file into the first category.

17. The computer program product of claim 16, wherein the one or more adjacent tracks of the first group of one or more adjacent tracks are, at least in part, outer tracks of the hard disk drive relative to the one or more adjacent tracks of the second group of one or more adjacent tracks.

18. The computer program product of claim 16, wherein the one or more adjacent tracks of the first group of one or more adjacent tracks are, at least in part, inner tracks of the hard disk drive relative to the one or more adjacent tracks of the second group of one or more adjacent tracks.

* * * * *